United States Patent [19]

Kitagawa

[11] 4,295,717
[45] Oct. 20, 1981

[54] CAMERA WITH OPERATION INDICATOR FOR AUTO-STROBO UNIT

[75] Inventor: Masahiro Kitagawa, Hachioji, Japan

[73] Assignee: Olympus Optical Company, Ltd., Tokyo, Japan

[21] Appl. No.: 33,165

[22] Filed: Apr. 25, 1979

[30] Foreign Application Priority Data

May 31, 1978 [JP] Japan ................................. 53-65128

[51] Int. Cl.³ ...................... G03B 15/05; G03B 17/18
[52] U.S. Cl. ........................................ 354/33; 354/53; 354/60 E; 354/60 L; 354/128; 354/289
[58] Field of Search .................. 354/33, 53, 602, 127, 354/128, 145, 238, 289, 60 E; 315/132-136, 151, 241 P; 340/660, 659, 378.1, 636, 384 E; 352/171

[56] References Cited

U.S. PATENT DOCUMENTS

| | | | |
|---|---|---|---|
| 3,487,404 | 12/1969 | Midkiff | 340/384 E |
| 3,776,625 | 12/1973 | Fountain | 352/171 X |
| 3,778,672 | 12/1973 | Fountain | 315/241 P |
| 3,898,514 | 8/1975 | Takahashi | 315/241 P X |
| 3,922,672 | 11/1975 | Birt et al. | 340/384 E |
| 3,983,448 | 9/1976 | Nakanishi | 315/241 P X |
| 3,999,193 | 12/1976 | Hasegawa | 354/128 |
| 4,013,921 | 3/1977 | Corthell | 315/241 P X |
| 4,047,194 | 9/1977 | Nakamura et al. | 354/33 X |
| 4,068,150 | 1/1978 | Iwata et al. | 354/127 X |
| 4,134,660 | 1/1979 | Sakurada et al. | 354/289 |
| 4,152,055 | 5/1979 | Ohta et al. | 354/60 L X |
| 4,163,924 | 8/1979 | Hasegawa et al. | 354/127 X |

Primary Examiner—L. T. Hix
Assistant Examiner—William B. Perkey
Attorney, Agent, or Firm—Weinstein & Sutton

[57] ABSTRACT

A camera with operation indicator for auto-strobo unit which includes a light emitting element which indicates the completion of a flashlight illumination by the strobo unit. The operation indicator includes a separate light emitting element located within the finder of the camera to provide a luminous indication within the finder whether a flashlight illumination from the strobo unit has been properly given.

28 Claims, 15 Drawing Figures

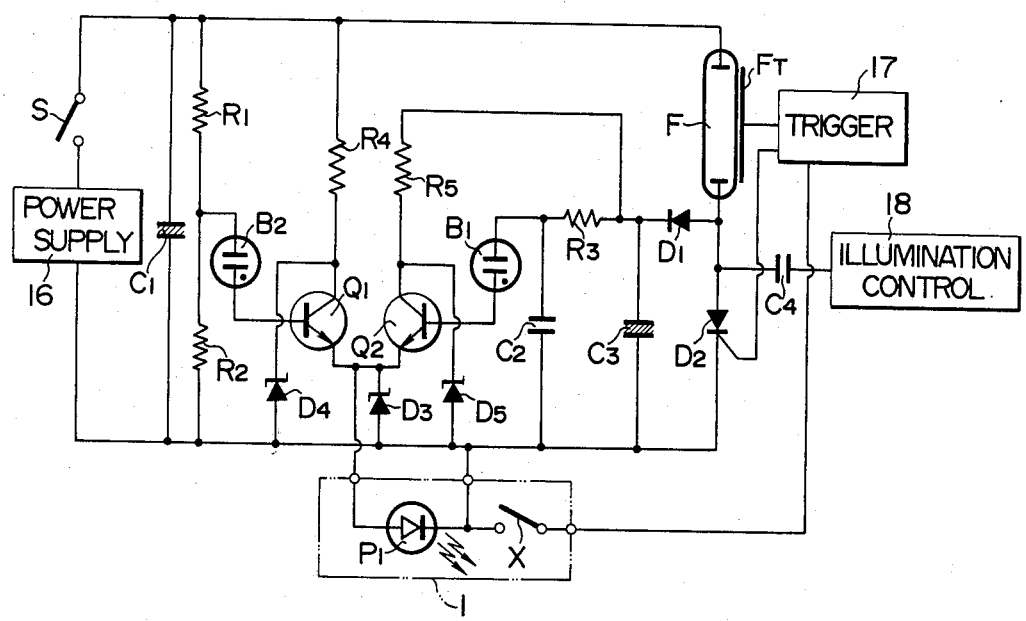
F I G. 6

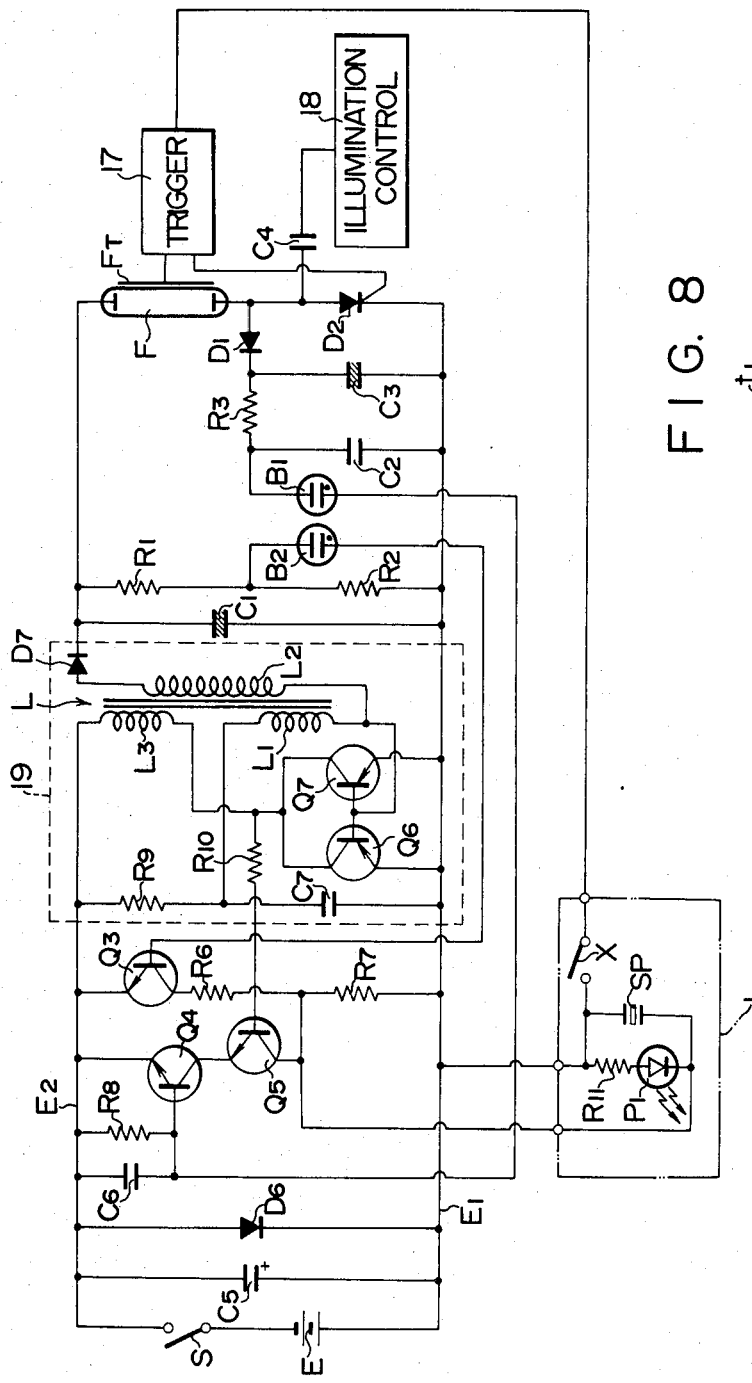
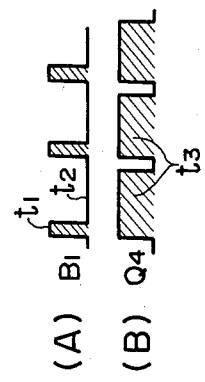

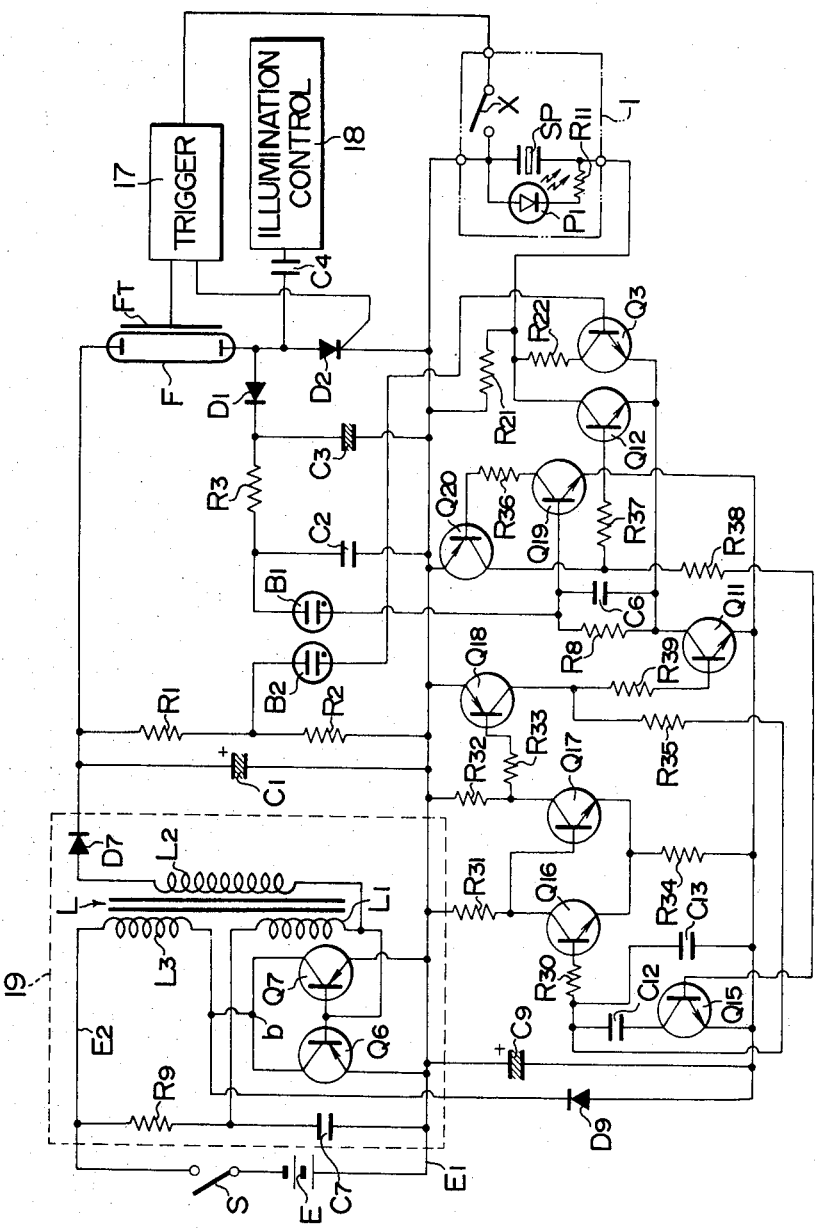
F I G. 14

CAMERA WITH OPERATION INDICATOR FOR AUTO-STROBO UNIT

BACKGROUND OF THE INVENTION

The invention relates to a camera with operation indicator for auto-strobo unit, and more particularly, to a camera having an indicator located within a finder of the camera which indicates a condition of the auto-strobo unit such as the completion of a charging operation or the completion of a flashlight illumination thereof.

An auto-strobo unit is well known as one form of an electronic flash assembly the illumination of which is automatically controlled. Such unit is arranged such that a reflecting light from an object being photographed which is illuminated by a flashlight illumination from a flash discharge tube, as triggered in synchronism with a shutter release operation of the camera, is determined by an illumination control circuit including a photometric circuit which produces an illumination interrupt signal at a given exposure level to terminate the illumination from the tube, thus automatically assuring a proper level of exposure.

The fact that the unit is completely charged in preparation to a flashlight illumination or that it has successfully completed a flashlight illumination is indicated by a luminous display located on the back thereof. Consequently, when the unit is mounted on the camera, the user has to move his eyes from the finder in order to recognize such display. The movement of the eyes to confirm that the unit is ready to initiate a flashlight illumination would present no problem while it would be extremely cumbersome to recognize the completion of a flashlight illumination, particularly when a series of pictures are taken in succession in synchronized relationship with the flashlight illuminations. Therefore, it will be appreciated that it would be convenient to provide an indication within the finder of the camera which indicates the completion of a charging operation and of a successful flashlight illumination.

SUMMARY OF THE INVENTION

It is an object of the invention to eliminate above disadvantage of the prior art by providing a camera with operation indicator for auto-strobo unit in which a light emitting element is disposed within the finder of the camera to indicate the completion of a flashlight illumination from the unit.

It is another object of the invention to provide a camera with operation indicator for auto-strobo unit including a light emitting element located within the finder of the camera which is continuously illuminated or blinks to indicate the completion of charging operation or a flashlight illumination of the unit.

It is a further object of the invention to provide a camera with an operation indicator for auto-strobo unit including a light emitting element located within the finder of a camera which is either continuously illuminated and/or blinks to indicate the completion of a flashlight illumination from the unit alone or the completion of both a charging operation and a flashlight illumination, and also including a sound producing element located within the camera which is adapted to effect a continuous or intermittent sounding operation for the purpose of such indication.

In accordance with the invention, a light emitting element is located within the finder of a camera which may be selectively energized from a charging circuit or a flashlight illumination control circuit contained within an auto-strobo unit. The element is either continuously illuminated or blinks to indicate the completion of a charging operation or a flashlight illumination of the unit. In this manner, the user is enabled to confirm either result without moving his eyes from the finder of a camera.

In accordance with another aspect of the invention, a sound producing element is suitably located within the camera and is electrically connected in parallel with the light emitting element in order to provide a similar indication. This would be particularly effective as in taking a picture with a self-timer where the user will not view the finder.

BRIEF DESCRIPTION OF THE DRAWINGS

FIGS. 5 and 6 are circuit diagrams illustrating modifications of the circuit shown in FIG. 4;

FIG. 7 is a circuit diagram of another example of an electrical circuit;

FIGS. 8(A) and (B) illustrate waveforms of operating currents which appear at certain points of the circuit shown in FIG. 7;

FIG. 14 is a circuit diagram of a still further example of an electrical circuit.

DESCRIPTION OF PREFERRED EMBODIMENTS

Figure 1:
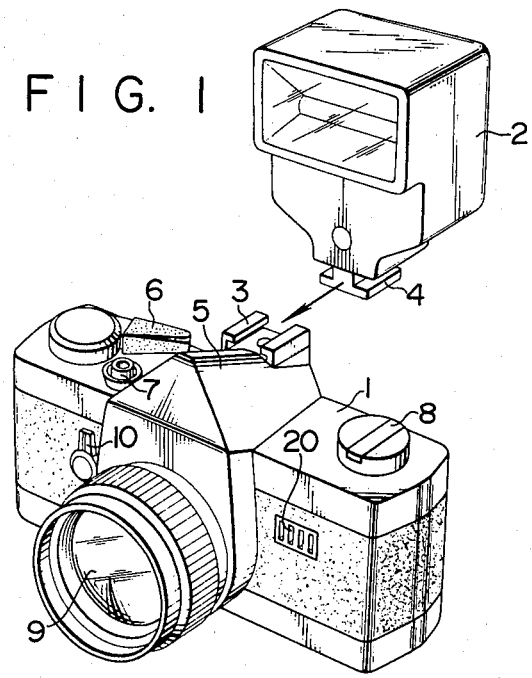
FIG. 1 is a perspective view of camera with operation indicator according to the invention.
Figure 2:
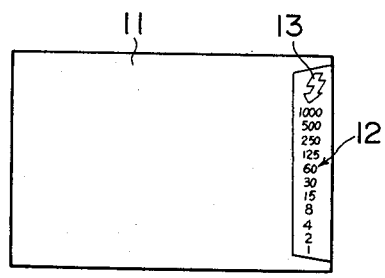
FIG. 2 is a schematic view illustrating one example of the field of sight of a finder of the camera shown in FIG. 1.

Referring to FIG. 1, there is shown a camera 1 to which the invention is applied, in combination with auto-strobo unit 2 which is adapted to be mounted on the camera. The camera 1 includes a shoe 3 which cooperates with a fixture on the strobo unit 2 to permit a detachable mounting of the unit on the camera 1. In the example shown, the camera 1 represents a single lens reflex camera including a pentaprism 5 located on the top of the camera. Film winding knob 6, shutter button 7 and film rewind knob 8 are located on the top surface of the camera on the opposite sides of the pentaprism 5. A taking lens 9 projects forwardly of the camera, and a self-timer operating member 10 is located on the front surface of the camera. Also formed in the front surface is a grille 20 which is associated with a sound producing element to be described later. FIG. 2 shows an example of field of sight 11 of a finder. As shown, along the right-hand side, it is marked with a series of shutter speed values, and a lightning mark 13 is located on top thereof for continuous illumination or blinking operation as illuminated by a light emitting element which is provided in accordance with the invention.

Figure 3:
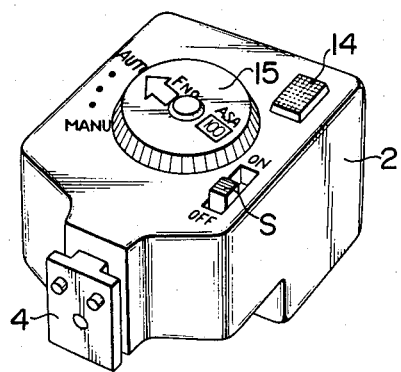
FIG. 3 is a perspective view of auto-strobo unit shown in FIG. 1, as viewed from the rear side.

FIG. 3 shows the backside of auto-strobo unit 2 in which a window 14 is formed in order to provide an external visible indication of the completion of a charging operation and a flashlight illumination of the unit. In addition, a power switch S of the electrical circuit of the unit as well as a switching dial 15 which may be operated between an AUTO and MANUAL position are located thereon. When the dial 15 is thrown to MANUAL position, it is brought into coincidence with a diaphragm value which is selected on the camera.

Figure 4:
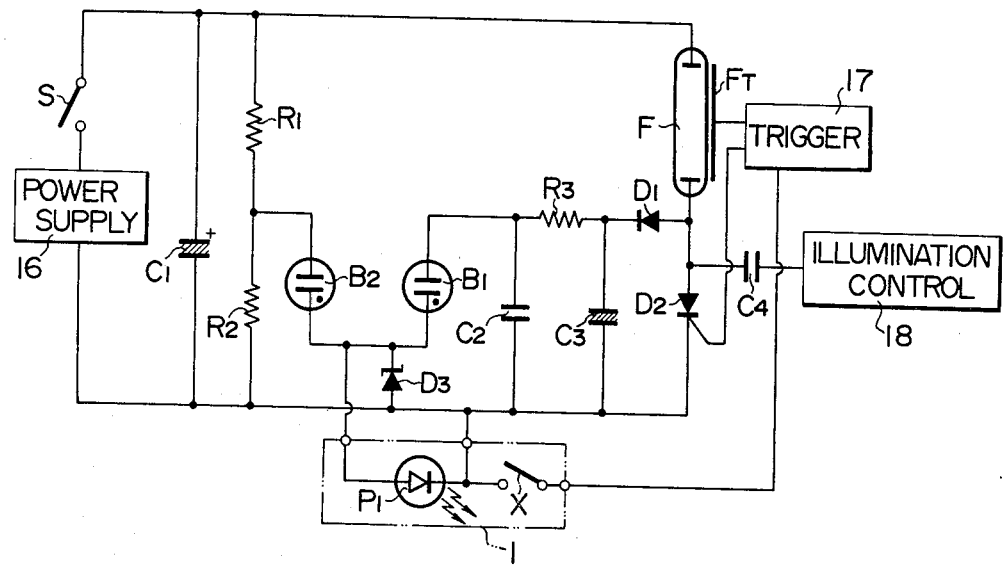
FIG. 4 is a circuit diagram of an electrical circuit which may be used in the combination of auto-strobo unit and camera according to the invention.

FIG. 4 shows one example of an electrical circuit which is contained in the camera of the invention. It is to be understood that the circuit shown includes an electrical circuit of the auto-strobo unit 2. However, it is to be noted that the electrical circuit of the strobo unit 2 which is used during its manual operation is not shown since it has no direct bearing with the present invention.

Referring to FIG. 4, the circuit includes a power supply circuit 16 which has its one end connected with the power switch S. Connected across the series combination of the circuit 16 and switch S are a main capacitor C1; a voltage divider including series connected resistors R1, R2; and a series combination of a flash discharge tube F and a main switching element D2 which is formed by a thyristor. The tube F has a trigger electrode FT which is connected with a trigger circuit 17 of a known form, supplying a trigger voltage thereto. The element D2 has a gate which is also fed from the trigger circuit 17. An illumination control circuit 18 is connected through capacitor C4 to the junction between the tube F and the anode of the element D2. A series combination of diode D1 and capacitor C3 is connected across element D2, and a series combination of capacitor C2 and resistor R3 is connected across the capacitor C3. A light emitting element B1 is connected in series with Zener diode D3 across the capacitor C2. The purpose of the diode D3 is to prevent an electric shock from being applied to a user. In the example shown, the element B1 is formed by a neon lamp. A similar neon lamp B2 is connected in series with the diode D3 across resistor R2. The neon lamp B1 operates to indicate the completion of a flashlight illumination from the auto-strobo unit while the neon lamp B2 indicates that the main capacitor C1 has been completely charged. The voltage level at which the neon lamp B2 is illuminated is determined by the voltage divider R1, R2.

The illumination control circuit 18 includes a photometric circuit having a light receiving element which is responsive to an optimum level of exposure given to an object being photographed which is illuminated by the flashlight from the tube F to produce an illumination interrupt signal which is applied through capacitor C4 to the anode of the main switch element D2, thus turning it off. Diode D1 then bypasses a current flow from the tube F to charge capacitor C3, which in turn supplies a charging current to capacitor C2 through resistor R3. The charge on the capacitor C2 is effective to cause a blinking of the element B1, indicating that the flashlight illumination has been terminated. The blinking operation of the neon lamp B1 takes place by being extinguished in response to a reduction in its internal resistance upon illumination, and reinitiating its illumination as capacitor C2 is charged again until its terminal voltage reaches a discharge level thereof.

Diode D3 is provided because camera 1 and strobo unit 2 are formed as separate bodies. Specifically, when strobo unit 2 is mounted on the camera, a high voltage may be developed across terminals thereof which are connected with the camera. An electric shock may be experienced as a result of such voltage, but can be effectively prevented by the provision of diode D3. It also serves protecting the electrical circuit which is contained within the camera at the time when the strobo unit is mounted thereon.

In accordance with the invention, a light emitting element P1 is located within the finder of camera 1. In FIG. 4, a block indicated by phantom line represents the camera 1, which normally contains synchro contacts X which are closed in synchronized relationship with a shutter release operation. The closure of contacts X activates the trigger circuit 17. The element P1 may be formed by a light emitting diode, for example, and its one end is connected to the junction between neon lamps B1 and B2 while its other end is connected to the power supply circuit 16. It may be energized by a continuous current flow through the element B2 or by a blinking current through the element B1. When the element P1 is energized in this manner, the lightning mark 13 located within the field of sight 11 of the finder (shown in FIG. 2) is either continuously or intermittently illuminated.

In operation, the power switch S may be closed to activate power supply circuit 16. When the main capacitor C1 is charged to a level which enables a discharge operation of the tube F, the voltage across resistor R2 rises to a sufficiently high voltage to illuminate the neon lamp B2, thus indicating that the charging operation has been completed. The lamp current also passes through the light emitting element P1 located within the finder of camera 1, thus continuously illuminating the lightning mark 13 located therein informing a user who is viewing the finder that the main capacitor C1 has been completely charged.

Subsequently when the shutter of the camera 1 is released to take a picture under flashlight illumination, trigger circuit 17 is activated to render tube F and switching element D2 conductive, permitting the tube F to produce a flashlight illumination. When the exposure reaches a given level, the illumination control circuit 18 becomes operative to apply an illumination interrupt signal to the switching element D2 through capacitor C4. Thereupon, the anode voltage of the element D2 is reduced and the latter turned off. The current flow through the tube F is then bypassed through diode D1 to charge capacitor C3, and the tube F ceases to illuminate. The charge on the capacitor C3 flows through resistor R3 to capacitor C2, which is charged to a given voltage level whereupon the neon lamp B1 commences its discharge, emitting light. Once the lamp B1 commences to discharge, its internal resistance decreases as does the discharge termination voltage level. Consequently capacitor C2 continues to discharge until such voltage level is reached whereupon the lamp B1 becomes extinguished. However, as capacitor C2 is charged, the lamp B1 is illuminated again. This operation is repeated until the charge on capacitor C3 is dissipated, whereby the lamp B1 effects a blinking operation. This blinking operation indicates that a flashlight illumination has been properly controlled. The blinking current through the lamp B1 also passes through the light emitting element P1 located within the finder to cause a similar blinking operation thereof to illuminate the lightning mark 13 intermittently, thus informing the user that the flashlight illumination has taken place in a proper manner.

When the illumination of the tube F is interrupted at an earier point in time to leave a sufficient residual charge on the main capacitor C1, the current flow through the lamp B2 will be superimposed on the blinking current through the lamp B1. In the event the residual charge on the main capacitor C1 is reduced, the blinking current through the lamp B1 alone is effective to cause a blinking operation of the element B1. In the event a proper exposure level is not reached if the tube F continues to be energized, the illumination control circuit 18 is ineffective to produce an illumination interrupt signal, so that the lamp B2 is extinguished without causing a blinking operation of lamp B1 and hence element P1.

Figure 5:
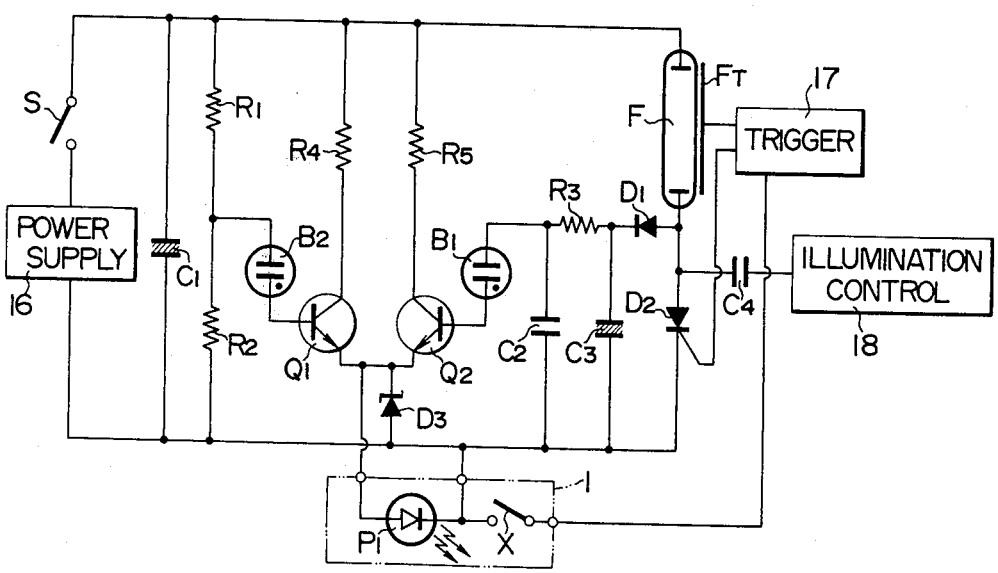

FIG. 5 shows a modification of the electrical circuit shown in FIG. 4 in that a reduced current flow through either lamp B1, B2 can be compensated for by amplifier transistors Q1, Q2. It will be appreciated that when the camera is placed in a bright environment such as outdoors in the daytime, it may be difficult to recognize the emission of light from the element P1 as it is energized by the discharge current from the lamp B1, B2 alone. To provide a compensation for this difficulty, the lamp current from B1, B2 may be applied to the base of amplifier transistors Q1, Q2 having their collector connected with one of the buses through resistor R4, R5 and having their emitter connected with the diode D3. In this manner, the blinking current through lamp B1 can be amplified by transistor Q2 before it is supplied to the element P1. Similarly, the current flow through the lamp B2 can be amplified by transistor Q1 before it is supplied to the element P1.

FIG. 6 shows a further modification of the electrical circuit shown in FIG. 5 in that diodes D4, D5 are connected between the collector of either transistor Q1, Q2 and the other terminal of the power supply circuit. This arrangement permits the use of amplifier transistors Q1, Q2 having a reduced voltage rating.

FIG. 7 shows another form of the electrical circuit which may be used in the camera 1 of the invention. The principal difference of this embodiment over the previous embodiment is the provision of a sound producing, piezoelectric element SP which may be suitably located within the camera 1, in addition to the light emitting element P1 located within the finder of the camera. The piezoelectric element produces an audible indication in combination with the luminous indication by the element P1.

Referring to FIG. 7, the circuit includes a source battery E having its positive terminal connected with a bus E1 and its negative terminal connected through power switch S with another bus E2. Connected across the buses E1, E2 are a capacitor C5, a circuit protecting diode D6, a series circuit including transistor Q3, which represents a second amplifier element, and resistors R6, R7, and a DC—DC converter 19. Another series circuit including transistor Q4 which represents a first amplifier element and transistor Q5 which represents a switching element is connected across the series combination of transistor Q3 and resistor R6. An integrator circuit including capacitor C6 and resistor R8 is connected across the base and emitter of transistor Q4.

The purpose of capacitor C5 is to prevent a large variation in the source voltage as an oscillator contained in the DC—DC converter 19 begins to oscillate. The DC—DC converter 19 is constructed in a known form, including transistors Q6, Q7, a step-up transformer L including primary coil L1, secondary coil L2 and tertiary coil L3, oscillation stabilizing capacitor C7, base bias resistor R9 and rectifier diode D7.

Considering first the converter circuit, transistor Q6, Q7 are of PNP type, having their bases and collectors connected together. In addition, the emitters of both transistors Q6, Q7 are connected together with the positive bus E1. Their base is connected with one end of primary coil L1, the other end of which is connected with the junction between capacitor C7 and resistor R9. Their collector is connected with one end of tertiary coil L3, the other end of which is connected with negative bus E2. Capacitor C7 and resistor R9 are connected in series across the both buses E1, E2. Secondary coil L2 has its one end connected with the base of these transistors while its other end is connected with the anode of rectifier diode D7.

In operation, the energy passing through these transistors and primary coil L1 energizes the secondary coil L2, which in turn energizes tertiary coil L3, which cooperates with these transisitors to maintain a sustained oscillation. A stepped-up voltage is developed across secondary coil L2 and is rectified by diode D7 to feed the remainder of the circuit which is shown to the right of the converter.

This circuit portion which relates to the discharge of the flash discharge tube F and the indicator circuit which displays its operation is constructed in quite the same manner as shown in FIG. 4 except that the current flow through lamp B2 is applied to the base of transistor Q3 while the blinking current through lamp B1 is supplied to the base of transistor Q4. Accordingly, a repeated description of this circuit portion will be omitted, noting that these circuit components are designated by like reference characters as used in FIG. 4.

Transistors Q3, Q4 and Q5 are of NPN type, and transistors Q3 and Q4 have their emitters connected with bus E2. The collector of transistor Q4 is connected with the emitter of transistor Q5, the base of which is connected through resistor R10 to the collectors of transistors Q6, Q7 which are included in the converter 19. The collector of transistor Q5 is connected to the junction between resistors R6, R7. As a result of such connection, transistor Q5 is repeatedly turned on and off with a frequency which corresponds to the oscillation frequency of the converter 19. In response to a signal of this oscillation frequency, the piezoelectric element SP produces sound as will be further described later.

The integrator including capacitor C6 and resistor R8 is effective to increase the duration of conduction of transistor Q4. Specifically, referring to FIG. 8(A), the lamp B1 is illuminated during a time interval $t_1$ and is extinguished during a time interval $t_2$. The conduction of transistor Q4 over a time interval $t_1$ is insufficient to operate the piezoelectric element SP. Hence, the integrator operates to increase the duration of conduction of transistor Q4 to a longer time interval $t_3$, as shown in FIG. 8(B).

The light emitting element P1 which is located within the finder of the camera 1 is connected in series with resistor R11, and the series combination is connected between the collector of transistor Q5 and bus E1. The piezoelectric element SP is connected in shunt with this series combination, and produces sound of an audio frequency which is given off through the grille 20 shown in FIG. 1.

In operation, when the power switch S is closed, the converter 19 begins to oscillate, with its stepped-up voltage output being rectified by diode D7 to feed the flash discharge circuit and its associated indicator circuit. As the main capacitor C1 is charged to a level which is sufficient to illuminate the lamp B2, the lamp current is fed to the base of transistor Q3, rendering it conductive. A current flow of a magnitude which is determined by the magnitude of resistors R6, R11 passes through the element P1 for its illumination. Consequently, the lightning mark 13 (FIG. 2) is illuminated, providing an indication within the finder that the main capacitor C1 has been completely charged. Under this condition, the piezoelectric element SP produces no sound.

Subsequently, a flashlight illumination is produced in response to a shutter release operation, and when a proper exposure has been given from the strobo unit, the illumination control circuit 18 produces a signal to terminate the illumination, whereupon the lamp B1 blinks, with its blinking current being supplied to the base of transistor Q4. Transistor Q4 then conducts intermittently with an increased conduction period as illustrated in FIG. 8. During the conduction of transistor Q5, a high frequency current flows through the element P1 and resistor R11, causing the element P1 to blink at such a high frequency. However, the blinking operation of the element P1 at this high frequency appears to be a continuous illumination to the human eyes, with result that the illumination of the element P1 represents a blinking operation which is controlled by the transistor Q4 that is alternately turned on and off. The high frequency blinking current is also applied to the piezoelectric element SP, which therefore produces sound in synchronized relationship with the blinking operation of the element P1. Consequently, both visible and audible indications are provided within the finder by the blinking element P1 and the piezoelectric element SP which intermittently produces sound as the lamp B1 blinks.

The purpose of resistor R7 is to provide a discharge path for the capacitance of the piezoelectric element SP during the non-conduction period of transistor Q5, thus facilitating the sound producing operation. It will be appreciated that the values of capacitor C6 and resistor R8 may be suitably adjusted to produce reverberation or to change the pitch or tone of the sound produced.

In the event a proper exposure is not reached if the tube F continues to be energized, the illumination control circuit 18 fails to produce an illumination interrupt signal, so that the lamp B1 does not blink and the lamp B2 becomes extinguished, precluding either operation of the elements P1 and SP.

In the arrangement shown in FIG. 7, it is to be understood that the converter 19 has a high step-up ratio, which requires a current flow of an increased magnitude through primary and tertiary coils L1 and L3 which must be supplied from the source battery E. This disadvantageously causes a large drop in the source voltage. When a battery having a low voltage on the order of three volts is used in the circuit of FIG. 7, it is possible that its terminal voltage goes below the forward voltage drop across the element P1, preventing an illumination thereof. This disadvantage can be avoided by the electrical circuit shown in FIG. 9 which represents a further embodiment of the invention.

Figure 9:
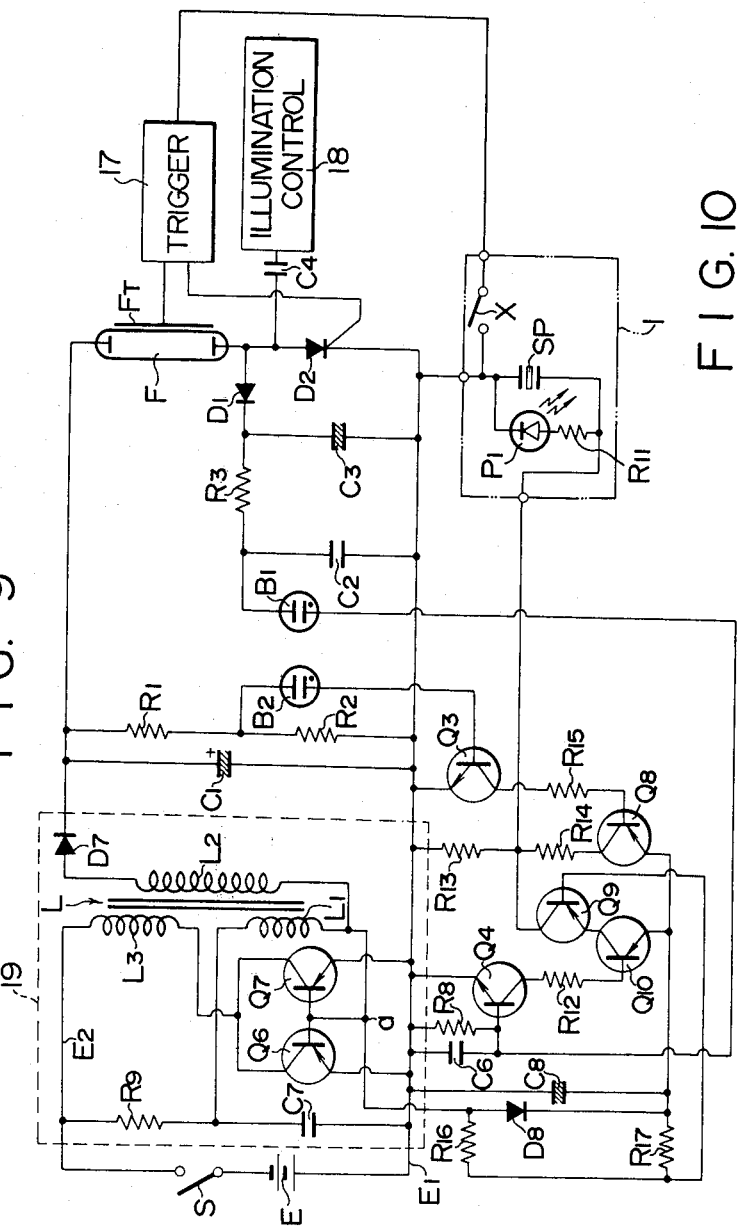
FIG. 9 is a circuit diagram of a further example of an electrical circuit.
Figure 10:
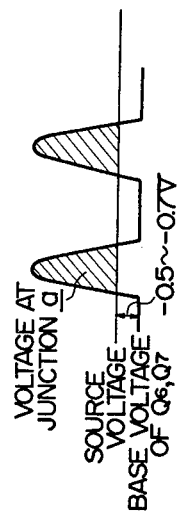
FIG. 10 is a voltage waveform appearing at a point in the circuit of FIG. 9.

In the arrangement of FIG. 9, DC-DC converter 19 includes oscillation transistors Q6, Q7 having their bases connected together at junction a where a voltage is developed having a positive excursion which exceeds the source voltage as illustrated in FIG. 10. In the present embodiment, this voltage is utilized to feed the indicator circuit including transistors Q3, Q4 as well as transistors Q8, Q9, Q10, resistors R8, R12 to R17 and capacitor C6 to enable the same operation as in FIG. 7, by rectifying this voltage by means of diode D8.

Specifically, referring to FIG. 9, diode D8 has its anode connected to the junction a and its cathode connected to the emitter of PNP transistor Q10, which has its base connected through resistor R12 to the collector of transistor Q4. The emitter of transistor Q4 is connected to the bus E1, and an integrating circuit including capacitor C6 and resistor R8 is connected between the base of this transistor and the bus E1.

Transistor Q10 has its emitter connected to the emitter of PNP transistor Q8, the collector of which is connected to the bus E1 through a series combination of resistors R14, R13. The base of transistor Q8 is connected through resistor R15 to the collector of transistor Q3, the emitter of which is connected to the bus E1. The base of transistor Q3 is supplied with a current flow through the neon lamp B2 which is illuminated to indicate the completion of a charging operation.

A smoothing capacitor C8 is connected between the cathode of diode D8 and the bus E1. The anode and cathode of diode D8 are connected to one end of resistors R16, R17, respectively, the other end of said resistors are connected together and connected with the base of transistor Q9. Transistor Q9 has its emitter connected to the collector of transistor Q10 and its collector connected to the junction between resistors R13, R14. The base of transistor Q4 is supplied with a blinking current from the neon lamp B1 which is adapted to indicate the completion of a flashlight illumination.

The light emitting element P1 which is located within the finder of camera 1 is connected in series with resistor R11 across the collector of transistor Q9 and the bus E1. The piezoelectric element SP is connected in shunt with the series combination of the element P1 and resistor R11.

In other respects, the circuit arrangement is similar as that shown in FIG. 7, and therefore will not be described.

In operation, when the main capacitor C1 is completely charged, the neon lamp B2 is illuminated, indicating to this effect. The energizing current is also fed to the base of transistor Q3, rendering it conductive. This in turn renders transistor Q8 conductive which is connected through resistor R15 to the collector of transistor Q3, whereby an energizing current is fed to the light emitting element P1 through resistors R14, R11, thus illuminating it. This indicates to the user the completion of a charging of the main capacitor C1. The piezoelectric element SP produces no sound at this time since d.c. voltage is applied thereto.

Subsequently, the shutter may be released to take a picture under flashlight illumination, and when a proper exposure is given, the illumination control circuit 18 produces a signal which causes a blinking operation of the neon lamp B1. The blinking current is intermittently supplied to the base of transistor Q4, thus intermittently rendering transisters Q4 and Q10 conductive. The integrator comprising capacitor C6 and resistor R8 increases the conduction period of both transistors Q4, Q10 so that the sound produced by the piezoelectric element SP may be of a comfortable quality.

It will be seen that transistor Q9 is repeatedly turned on and off with the oscillation frequency of converter 19 since the divided voltage appearing at the junction a is supplied to its base. The intermittent current flow through transistors Q4, Q10 is passed through transistor Q9, thereby feeding a high frequency current to the element P1 through resistor R11 during the time transistor Q9 conducts. Consequently, the element P1 blinks in accordance with the frequency of this current. The high frequency blinking current is also supplied to the piezoelectric element SP, which produces sound in synchronized relationship with the blinking operation of the element P1. In this manner, both visible and audible indication is given within the finder that the flashlight illumination has been properly given. Thus, it will be appreciated that the embodiment shown in FIG. 9 eliminates the disadvantage that the elements P1 and SP may fail to operate in response to a substantial drop of the source voltage.

Figure 11:
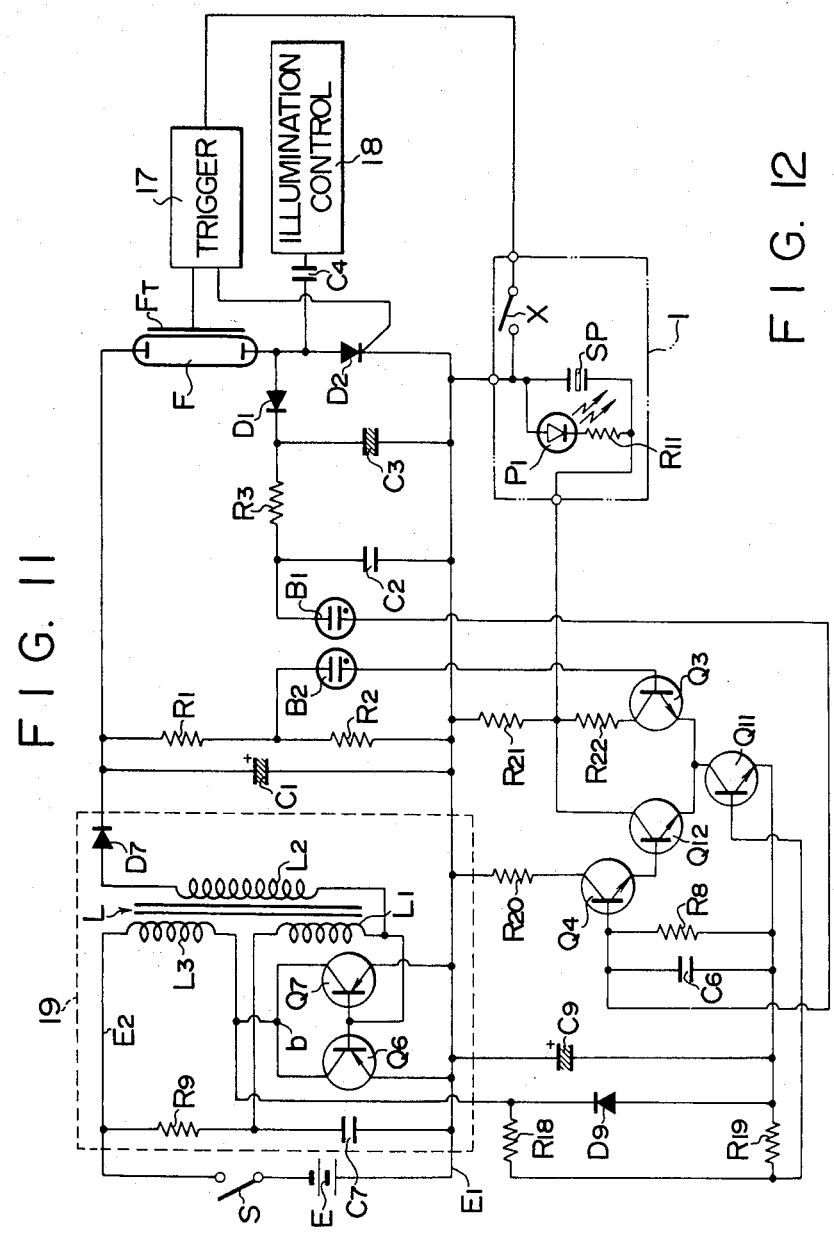
FIG. 11 is a circuit diagram of an additional example of an electrical circuit.
Figure 12:
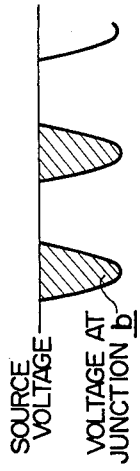
FIG. 12 shows a voltage waveform appearing at a selected point in the circuit of FIG. 11.

FIG. 11 shows a modification of the arrangement shown in FIG. 9. As illustrated in FIG. 12, the voltage developed at junction b between the collectors of transistors Q6, Q7 contained in the converter 19 has a negative excursion which exceeds the source voltage. This voltage may be utilized to operate the indicator circuit. Specifically, diode D9 has its cathode connected to the junction b and its anode connected to the emitter of NPN transistor Q11, the collector of which is connected to the emitter of transistor Q12 and the base of which is connected to one end of resistors R18, R19, the other end of said resistors being connected to the opposite ends of diode D9. Transistor Q12 has its base connected to the emitter of transistor Q4, the collector of which is connected to the bus E1 through resistor R20. An integrating circuit including capacitor C6 and resistor R8 is connected between the base of transistor Q4 and the emitter of transistor Q11. The base of transistor Q4 is supplied with the blinking current from the neon lamp B1 which indicates the completion of flashlight illumination. The emitter of transistor Q12 is also connected to the emitter of transistor Q3, the collector of which is connected with the bus E1 through a voltage divider including resistors R21, R22. Supplied to the base of transistor Q3 is a current flow from the neon lamp B2 which indicates the completion of a charging operation. The junction between resistors R21, R22 is connected to the collector of transistor Q12. A smoothing capacitor C9 is connected between the anode of diode D9 and the bus E1.

The light emitting element P1 which is located within the finder of camera 1 is connected in series with resistor R11 across the collector of transistor Q12 and the bus E1, and the piezoelectric element SP is connected in shunt with the series combination of the element P1 and resistor R11.

In other respects, the circuit arrangement is similar to that shown in FIG. 9 and corresponding parts are designated by like reference characters and hence will not be described.

In operation, upon completion of a charging of the main capacitor C1, the neon lamp B2 is illuminated. The lamp current is fed to the base of transistor Q3, which is therefore turned on. Transistor Q11 is then rendered conductive by a high frequency current from converter 19 to pass such current from the junction between resistors R21, R22 to the elements P1 and SP located within the finder, causing the light emitting element P1 to illuminate and causing the piezoelectric element SP to produce sound continuously. This provides an indication that the charging of main capacitor C1 is completed. However, the emission of light by the element P1 and the sound produced by the element SP are both of a relatively low level since the high frequency current supplied thereto is divided by resistors R21, R22.

After a picture is taken under a flashlight illumination and the illumination control circuit 18 produces a signal which causes a blinking operation of the neon lamp B1, this blinking current is intermittently supplied to the base of transistor Q4, causing transistors Q4 and Q12 to be intermittently conductive. The integrator including capacitor C6 and resistor R8 increases the conduction period of the both transistors Q4, Q12 so that the tone quality produced by the piezoelectric element SP be comfortable one.

Since the base of transistor Q11 is supplied with the divided voltage appearing at the junction b, it repeats turn-on and -off operation in accordance with the oscillation frequency of the converter. The intermittent current flow through transistors Q4, Q12 passes through transistor Q11 when the latter is conductive, whereby a high frequency current is passed through the element P1 through resistor R11 and transistor Q12 to cause a blinking operation thereof. The blinking current of this high frequency is also applied to the piezoelectric element SP, which therefore produces sound in synchronized relationship with the blinking operation of the element P1. Thus both visible and audible indication is provided within the finder that the flashlight illumination has been properly effected. At this time, the high frequency current is supplied to the elements P1 and SP directly from the collector of transistor Q12 without being passed through the voltage divider, so that the luminous and acoustic levels produced by elements P1 and SP are higher than those used to indicate the completion of a charging operation.

It should be understood that when tube F has supplied a great magnitude of illumination and the residual charge on capacitor C1 at the termination of the flashlight illumination is reduced to deactivate the neon lamp B2 as well as the elements P1 and SP, the indication of the completion of the flashlight illumination takes place alone. If the discharge tube F has provided a reduced amount of illumination and there is an increased residual charge on capacitor C1 at the termination of the flashlight illumination, both the neon lamp B2 and element P1 continue to illuminate and the piezoelectric element SP also continues to produce sound. The intermittent current which is intended to indicate the completion of the flashlight illumination is superimposed with this current flow, so that the luminous and acoustic levels produced by the elements P1 and SP vary between high and low levels. In this manner, the arrangement shown in FIG. 11 utilizes an increased negative excursion of voltage developed within the converter 19 which exceeds the source voltage to operate the indicator circuit. This assures a satisfactory operation of the light emitting element P1 and the piezoelectric element SP in the event the source voltage is greatly reduced.

Figure 13:
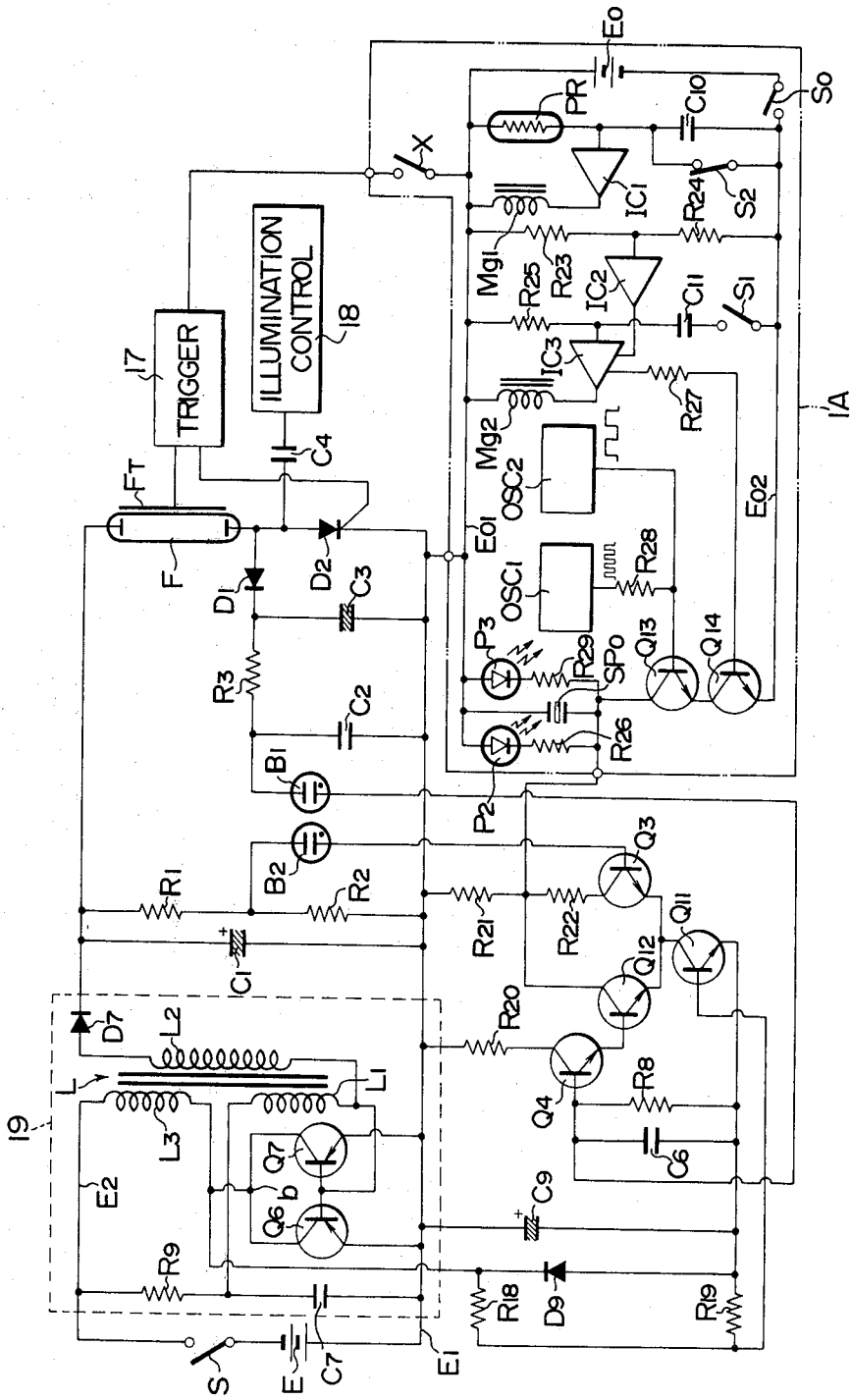
FIG. 13 is a circuit diagram of still another example of an electrical circuit.

FIG. 13 shows still another embodiment of the invention. The indication of completion of a charging operation and a flashlight illumination is given by utilizing light emitting diode P2 and piezoelectric element SPO which are originally used to indicate the operation of a self-timer.

Referring to FIG. 13, a camera 1A having an electrical shutter includes an electrical circuit which is shown within a phantom line block 1A. Specifically, the circuit includes source battery EO having its negative terminal connected in series with power switch SO. A pair of buses EO1 and EO2 are connected across the series combination of battery EO and switch SO. Connected across these buses is a series path including photelectric element PR, which is shunted by a series combination of shutter closing electromagnet Mg1 and a shutter control amplifier IC1, and capacitor C10 which is also shunted by shutter trigger switch S2; a voltage divider including resistors R23, R24 having the junction therebetween connected with an input of a supply voltage decision comparator IC2 having its output connected with a control terminal of a self-timer control comparator IC3; a self-timer delay circuit including a series combination of resistor R25, capacitor C11 and self-timer switch S1, with the junction between resistor R25 and capacitor C11 feeding an input to the comparator IC3; and a series path including a light emitting element P2 which indicates the operation of the self-timer, resistor R26 and a pair of series connected transistors Q13, Q14. The series combination of the element P2 and resistor R26 is shunted by a piezoelectric element SPO and also by a series combination of another light emitting element P3 which represents an external display and resistor R29. It is to be noted that the element P2 is located within the finder of the camera. The output of comparator IC3 is connected with one end of an electromagnet Mg2 which has its other end connected with bus EO1 and which is operable to control the operation of the self-timer. The comparator IC3 also includes a control terminal which is connected with resistor R27, the other end of which is connected with the base of transistor Q14. The base of transistor Q13 is fed through resistor R28 from a first oscillator OSC1 which produces a high frequency pulse signal, and is also directly fed from a second oscillator OSC2 which produces a low frequency pulse signal.

The first oscillator OSC1 may produce a pulse signal of a frequency on the order of 1 kHz, for example, while the second oscillator OSC2 may produce a pulse signal of a frequency on the order of 2 Hz, for example. Transistor Q13 has its collector connected with resistors R26, R29 as well as piezoelectric element SPO and its emitter connected with the collector of transistor Q14, the emitter of which is connected with the negative bus EO2. It should be noted that the amplifier IC1, comparators IC2 and IC3 are formed by integrated circuit elements. Finally, the electrical circuit of the camera includes a switch X, representing synchro contacts, which is connected with the trigger circuits 17.

In operation, when the camera 1A is used to take a picture utilizing a self-timer, the self-timer switch S1 is initially closed, followed by the depression of a shutter button. The power switch SO is then closed, and the voltage divider R23, R24 feeds comparator IC2 to determine the source voltage. When it is determined that the source voltage is above a given level, comparator IC2 produces an output which operates comparator IC3 to activate the selftimer delay circuit comprising resistor R25, capacitor C11 and self-timer switch S1. Simultaneously, comparator IC3 produces a control signal which renders transistor Q14 conductive. Transistor Q13 is repeatedly turned on and off in response to both a high and a low frequency pulse signal from the oscillators OSC1 and OSC2. The resulting intermittent current flow through transistor Q13 causes the piezoelectric element SPO to produce sound intermittently and also causes the light emitting elements P2 and P3 to blink, thus providing an indication that the self-timer is in operation.

When the self-timer times out or the delay time established by the delay circuit passes, comparator IC3 is activated to energize electromagnet Mg2 to open the shutter. As the shutter opens, the shutter trigger switch S2 opens, initiating the operation of the electrical shutter. A time constant circuit formed by photoelectric element PR and capacitor C10 operates to determine a proper exposure period. When a proper exposure has been given, amplifier IC1 is activated to energize electromagnet Mg1 to close the shutter, thus completing a self-timer operation.

The embodiment shown in FIG. 13 operates to provide both visible and audible indication of completion of a charging operation as well as a flashlight illumination of an auto-strobo unit by utilizing the elements P2 and SPO. As mentioned previously, the element P2 associated with the self-timer is located within the finder of the camera while the piezoelectric element SPO associated with the self-timer is suitably located within the camera.

It will be noted that the arrangement of the autostrobo unit shown in FIG. 13 is the same as that shown in FIG. 11. Hence, it is only necessary that the junction between resistors R21, R22 and the collector of transistor Q12 be connected to one end of resistor R26 and piezoelectric element SPO and to connect the bus EO1 to the bus E1.

When so connected, as the neon lamp B2 is illuminated, transistor Q3 operates in the manner mentioned in connection with FIG. 11 to feed a high frequency current to the elements P2 and SPO from the junction between resistors R21 and R22, causing element P2 to illuminate continuously and causing piezoelectric element SPO to produce the sound continuously. This provides an indication that the charging of the main capacitor C1 contained in the strobo unit has been completed.

When a flashlight illumination is terminated after a picture has been taken under a flashlight illumination, the neon lamp B1 blinks, feeding an intermittent current of a high frequency from the collector of transistor Q12 to the elements P2 and SPO. The element P2 blinks while the element SPO produces sound intermittently. This provides an indication that the flashlight illumination of the strobo unit has been properly completed.

FIG. 14 shows a still further embodiment of the invention which permits the luminous level provided by the light emitting element P1 and the tone of sound produced by the piezoelectric element SP to be changed between the continuous operation thereof which indicate the completion of a charging operation and the intermittent operation which indicate the completion of the flashlight illumination.

Referring to FIG. 14, it will be noted that the power supply circuit including DC—DC converter 19 is the same as that shown in FIG. 11. Additionally, the flash tube discharge circuit including elements C1, F, D2 and trigger circuit 17, the indicator circuit which indicates the completion of a charging operation and including resistors R1, R2 and neon lamp B2, as well as the indicator circuit which indicates the completion of a flashlight illumination and including elements C2, C4, R3, D1, 18 and B1 are also the same as the corresponding components shown in FIG. 11. Consequently, these components are designated by like reference characters as before, and will not be described.

The electrical circuit of FIG. 14 additionally includes an oscillator comprising transistors Q15 to Q18, capacitors C12, C13 and resistors R30 to R35 which are connected to the positive bus E1 as shown. In addition, transistors Q3, which represents a first amplifier element, transistor Q12, which represents a second amplifier element, switching transistor Q11 and other transistors Q19, Q20, resistors R8, R21, R22 and R36 to R39 and capacitor C6 form part of the luminous and acoustic indicator circuit. Both the oscillator and the indicator circuit are fed from a voltage appearing at the junction b within the converter 19 which is rectified by diode D9 and smoothed by capacitor C9.

In the oscillator, transistor Q18 has its emitter connected to the bus E1, its base connected through resistor R33 to the collector of transistor Q17 and its collector connected through resistors R35 and R30 to the base of transistor Q16. Transistor Q16 has its collector connected to the bus E1 through resistor R31 and also connected to the base of transistor Q17, the collector of which is connected to the bus E1 through resistor R32. The both emitters of transistors Q17 and Q16 are connected together, and are connected through resistor R34 to the anode of diode D9. Transistor Q15 has its emitter connected to the anode of diode D9 and its collector connected through capacitor C12 to the junction between resistors R30 and R35. One end of capacitor C13 is connected to the junction between resistors R30, R35 while its other end is connected to the emitter of transistor Q15.

In the indicator circuit, transistor Q20 has its emitter connected to the bus E1, its collector connected through resistor R38 with the base of transistor Q15 and its base connected through resistor R36 to the collector of transistor Q19, the base of which is connected to the collector of transistor Q11 through an integrating circuit including resistor R8 and capacitor C6. The base of transistor Q11 is connected to the collector of transistor Q18 through resistor R39. Both emitters of transistors Q11 and Q19 are connected together, and are connected to the emitter of transistor Q15. The base of transistor Q19 is supplied with the blinking current from the neon lamp B1.

Both emitters of transistors Q3, Q12 are connected together, and are connected to the collector of transistor Q11. The base of transistor Q12 is connected to the collector of transistor Q20 through resistor R37. The collector of transistor Q3 is connected with the bus E1 through resistors R22, R21, with the junction therebetween being connected with the collector of transistor Q12. The base of transistor Q3 is supplied with the current flow from the neon lamp B2.

The light emitting element P1 which is located within the finder of camera 1 is connected in series with resistor R11 between the collector of transistor Q12 and the bus E1, and the piezoelectric element SP is connected in shunt with the series combination of elements P1, R11. As before, character X represents synchro contacts.

In operation, when the neon lmp B1 is not operating, transistors Q15, Q12, Q19 and Q20 remain off and the oscillation is maintained by only capacitor C13. Specifically, when power switch is intially turned on, the voltage across the capacitor C13 is zero, so that transistor Q16 is non-conductive while transistors Q17, Q18 are conductive. This initiates a charging of capacitor C13 through transistor Q18 and resistor R35. When the capacitor is charged to a given voltage, transistor Q16 is rendered conductive while transistors Q17, Q18 become non-conductive, whereby capacitor C13 discharges through resistor R30 and the base of transistor Q16. When capacitor C13 discharges to a given level, transistor Q16 becomes non-conductive again while transistors Q17, Q18 become conductive, recharging capacitor C13.

The above operation is repeated to sustain an oscillation. Consequently, transistor Q11 which is connected through resistor R39 to transistor Q18 normally switches between its conductive and non-conductive states in accordance with the oscillation frequency. If the charging of main capacitor C1 is now completed to illuminate the neon lamp B2, transistor Q3 is rendered conductive simultaneously, whereby the element P1 located within the finder is illuminated continuously, and piezoelectric element SP also produces sound continuously in accordance with the oscillation frequency. This indicates the completion of a charging of the main capacitor C1.

When the illumination control circuit 18 produces a signal which causes a blinking operation of the neon lamp B1 after a picture has been taken under a flashlight illumination, the blinking current is supplied to the base of transistor Q19, whereby transistors Q19, Q20, Q12 and Q15 become conductive. The conduction of transistor Q15 connects capacitor C12, which is connected with its collector, in parallel with capacitor C13, thus changing the oscillation frequency of the oscillator. In the present example, the oscillation frequency is reduced. An intermittent current flow of the reduced frequency is supplied from the collector of the conducting transistor Q12 to the elements P1 and SP, which blinks and produces sound intermittently, respectively, thus indicating the completion of the flashlight illumination. The luminous level during the blinking operation and the tone pitch of the intermittent sound are different from those which prevail when the completion of a charging operation is indicated, inasmuch as the oscillation frequency has changed, thus providing a clear distinction.

In the embodiment described above, the piezoelectric element SP has been described as being disposed on the part of the camera, but it may be disposed within the strobo unit as well.

What is claimed is:

1. A camera with means to receive an auto-strobo unit, said auto-strobo unit including a first light emitting element for indicating the completion of a proper flashlight illumination and a second light emitting element for indicating the completion of a charging operation of said strobo unit; a viewfinder; and an operation indicator comprising a third light emitting element which is located within said viewfinder and which is responsive to a current flow through said first and second light emitting elements provided within said auto-strobo unit for providing an indication within said viewfinder that said charging operation and said flashlight illumination of the strobo unit have been properly completed.

2. Camera according to claim 1 in which the light emitting element located within the viewfinder comprises a light emitting diode.

3. Camera according to claim 1 in which a current flow supplied to the light emitting element located within the viewfinder represents an intermittent current when it is fed from the first mentioned light emitting element and represents a continuous current when it is fed from said second light emitting element.

4. A camera according to claim 1 further including a sound-producing element located within said camera for providing an audible indication of the completion of a flashlight illumination and of a charging operation of said strobo unit.

5. A camera according to claim 1 further including a DC—DC converter in said strobo unit and including an oscillator circuit and a switching element responsive to an oscillating voltage from said oscillator circuit.

6. Camera according to claim 1 wherein said auto-strobo unit further comprises amplifying element means for amplifying the current flow before it is supplied to the light emitting element located with the viewfinder.

7. Camera according to claim 6 in which the amplifying element means comprises a transistor and a Zener diode connected between the transistor and a power supply to protect the transistor.

8. Camera according to claim 1 wherein said auto-strobo unit further comprises amplifying element means for amplifying the current flow from said second light emitting element of the strobo unit before it is supplied to the light emitting element located within the viewfinder.

9. Camera according to claim 8 in which the amplifying element means comprises a transistor and a Zener diode connected between the transistor and a power supply to protect the transistor.

10. Camera with means to receive an auto-strobo unit, said auto-strobo unit including a DC—DC converter including an oscillator circuit and a light emitting element which indicates the completion of a proper flashlight illumination of the auto-strobo unit; an operation indicator comprising a switching element responsive to an oscillating voltage from the oscillator circuit, said auto-strobo unit comprising a first amplifying element means connected in series with the switching element for amplifying a current flow from the light emitting element; and a sound producing element located within said camera to produce sound in response to the operation of the switching element and the amplifying element.

11. Camera according to claim 10, said auto-strobo unit further comprising an integrating circuit means including a capacitor and a resistor coupled thereto for integrating the current flow.

12. Camera according to claim 10 in which said DC—DC converter includes an oscillating transistor and the switching element is responsive to an oscillating voltage developed at the collector of said oscillating transistor included in the DC—DC converter and which exceeds a supply voltage.

13. Camera according to claim 10 in which the DC—DC converter includes an oscillating transistor, and the switching element is responsive to an oscillating voltage developed at the base of said oscillating transistor and which exceeds a supply voltage.

14. Camera according to claim 10 in which both the switching element and the first amplifying element comprise transistors.

15. Camera according to claim 10 further comprising an electrical shutter and an electronic self-timer circuit comprising said sound producing element.

16. Camera according to claim 10 in which the auto-strobo unit also includes another light emitting element which indicates the completion of a charging operation of the strobo unit, the operation indicator further comprising a second amplifying element means connected in parallel with the first amplifying element for amplifying a current flow from said another light emitting element to feed the sound producing element to provide an audible indication of the completion of a charging operation of the auto-strobo unit.

17. Camera according to claim 10, further comprising a viewfinder, a separate light emitting element located within the viewfinder of said camera and electrically connected in parallel with the sound producing element and responsive to the light emitting element in said strobo unit, thereby providing a luminous indication within the viewfinder that the flashlight illumination of the strobo unit has been properly completed.

18. Camera according to claim 17 further comprising an electronic self-timer and electrical shutter circuit means wherein said light emitting element disposed in said viewfinder is responsive to said electronic self-timer to indicate operation thereof.

19. Camera according to claim 17 in which the auto-strobo unit also includes another light emitting element which indicates the completion of a charging operation of the strobo unit, the operation indicator further comprising a second amplifying element means for amplifying a current flow from said another light emitting element before it is supplied to the light emitting element located with the viewfinder.

20. Camera according to claim 19 in which the light emitting element located within the viewfinder is supplied with a continuous current flow from the second amplifying element means and is supplied with a blinking current flow from the first amplifying element means.

21. Camera according to claim 19 in which the second amplifying element means comprises a transistor.

22. Camera according to claim 10 further comprising a rectifier for changing an oscillating voltage from the oscillator circuit into a d.c. voltage to feed the switching element, the first amplifying element means, and the sound producing element.

23. Camera according to claim 22 in which the DC—DC converter includes an oscillation transistor which produces at its collector an oscillating voltage having an excursion which exceeds a supply voltage, and a rectifier means for rectifying the oscillating voltage to feed the switching element, the first amplifying element, and the sound producing element.

24. Camera according to claim 22 in which the DC—DC converter includes an oscillation transistor which produces at its base an oscillating voltage having an excursion which exceeds a supply voltage, a rectifier for rectifying the oscillating voltage to feed the switching element, the first amplifying element and the sound producing element.

25. Camera with means to receive a strobo unit, the strobo unit including a first light emitting element which indicates the completion of a proper flashlight illumination of the strobo unit and a second light emitting element which indicates the completion of a charging operation of strobo unit; an operation indicator in said strobo unit comprising a first amplifying element for amplifying a current flow from the first light emitting element, a second amplifying element connected in parallel with the first amplifying element and amplifying a current flow from the second light emitting element, an oscillator circuit which has its oscillation frequency changes in response to a current flow from the first light emitting element, a switching element connected in series with both first and second amplifying elements and responsive to an output from the oscillator circuit; and a sound producing element located within said camera and connected in series with the first and second amplifying elements and the switching element for providing an audible indication of the completion of a flashlight illumination and of a charging operation of the strobo unit.

26. Camera according to claim 25, further comprising a viewfinder, a third light emitting element located with the viewfinder of said camera and electrically connected in parallel with the sound producing element, the third light emitting element providing a luminous indication of the completion of a proper flashlight illumination and a charging operation of the auto-strobo unit.

27. Camera according to claim 25 in which the oscillator circuit comprises a first capacitor which determines a normal oscillation frequency, a second capacitor, and a transistor which is rendered conductive in response to a current flow from the first light emitting element of the strobo unit for connecting the second capacitor in parallel with the first capacitor, whereby the conduction of the transistor changes the oscillation frequency.

28. A camera in accordance with claim 25 wherein said audible indication provides one tone to indicate the completion of the flashlight illumination and a different second tone to indicate the completion of the charging operation of the strobo unit.

* * * * *